April 12, 1960   W. C. BEARD, JR   2,932,432
METERING TYPE AEROSOL SPRAY DISPENSER
Filed Dec. 30, 1955   3 Sheets-Sheet 2

INVENTOR
WALTER C. BEARD JR.
BY Steward & Steward
HIS ATTORNEYS

April 12, 1960 W. C. BEARD, JR 2,932,432
METERING TYPE AEROSOL SPRAY DISPENSER
Filed Dec. 30, 1955 3 Sheets-Sheet 3

INVENTOR
WALTER C. BEARD JR.
BY Steward + Steward
HIS ATTORNEYS

United States Patent Office 2,932,432
Patented Apr. 12, 1960

2,932,432

METERING TYPE AEROSOL SPRAY DISPENSER

Walter C. Beard, Jr., Naugatuck, Conn., assignor to The Risdon Manufacturing Company, Naugatuck, Conn., a corporation of Connecticut Application December 30, 1955, Serial No. 556,532

11 Claims. (Cl. 222—394)

This invention relates to fluid dispensing means and especially to valves and valve mechanisms for dispensing aerosol sprays produced through the aid of a low boiling propellant.

It is an object of the present invention to provide a valve mechanism for a spray container which provides for economical use of the contents by dispensing a metered quantity only of the spray at each actuation of the valve mechanism. The contents of the container can thus be dispensed as a series of metered puffs, each puff terminating automatically even though the valve mechanism is held actuated. With this type of operation no further spray will be dispensed until the valve is released and reactuated and accordingly actuation of the valve mechanism, continued inadvertently for a period longer than intended, will not result in a protracted discharge and waste of the container contents.

Heretofore, such mechanisms as have been devised for the purpose of providing a metered spray dispensing action have been relatively complex in nature and expensive to build, or else have been subject to operational drawbacks. It is another object of the present invention, therefore, to provide a metering dispenser of the type indicated which will be economical to manufacture, and which will also be unusually reliable and convenient in operation for normally predictable periods of storage and use. In this connection, it should be borne in mind that valve mechanisms of the type here contemplated more especially comprise an integral part of containers which normally are of the "throw-away" type, that is, they are not intended to be recharged once the original charge of material has been dispensed. For this reason, and since this field is highly competitive commercially, low cost is of paramount importance.

In making spray dispensing valves it is highly desirable to provide an arrangement which can be used for pressure filling of the container after the valve assembly has been installed by merely supplying the charge under an appropriate pressure (usually something in excess of that pressure capable of holding the aerosol propellant in a liquid state) to the exterior of the valve assembly. The more common method of filling heretofore has been that of filling the container, prior to placement of the valve assembly thereon, with supercooled propellant and admixed material to be dispensed thereby, and then sealing the valve assembly in place quickly before substantial evaporation can take place. Pressure filling after the valve assembly is permanently sealed on the container therefore offers certain advantages. Prior attempts to provide metering valve mechanisms capable of providing this feature of pressure filling, however, have met with little success since, in the forms of valve which are found most practical, there is normally a tendency for the seal at one end of the metering chamber to be firmly active whenever the other end is unsealed, thus barring filling access to the storage chamber of the container at one end or the other of the metering chamber. In other instances, the valve constructions permit pressure filling only by way of a fine discharge orifice or nozzle, which so slows down the filling operation as to make it very impractical.

Another object of this invention, therefore, at least with respect to certain forms herein disclosed, is to provide an aerosol spray device of the metering type which will permit convenient pressure filling of the container.

A feature of the invention is the use of a compressible resilient sealing element which is normally free to move about in a chamber having guiding side walls but which can be compressed against a wall portion of the chamber adjacent a valve opening therein by an operating plunger to provide a seal for preventing passage of liquid through the opening for as long as the plunger is held depressed.

Another feature of the invention at least in certain forms thereof is the use of a compressible sealing element movable in a chamber having side walls and a ported end wall, and provision for preventing sealing of said element against the end wall when subject merely to fluid pressure in the chamber, but providing an arrangement whereby a plunger forcing said compressible element against said end wall can swell the same into contact with said side walls to effectively seal off the port.

Other objects, features and advantages will become apparent as the description proceeds.

Figure 1:
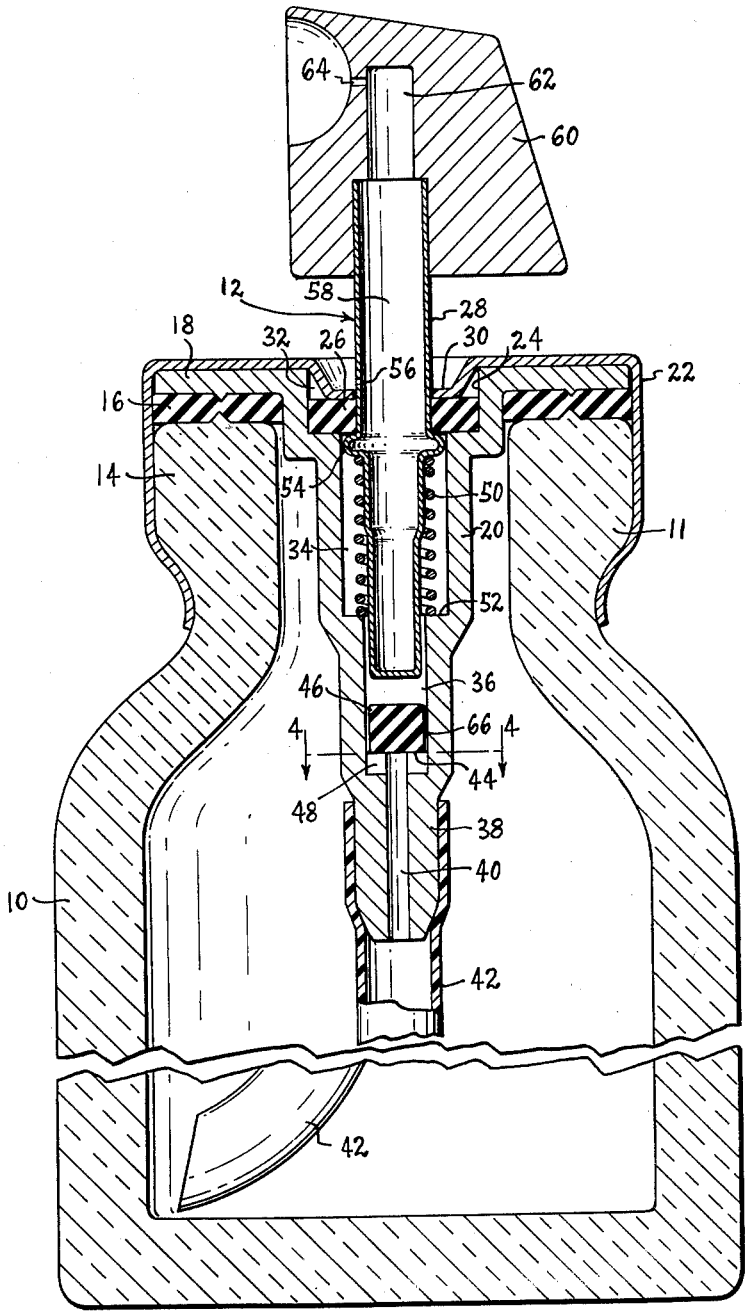
Fig. 1 is a longitudinal section through a container and valve mechanism according to the present invention.

Referring to Figs. 1 through 4 of the drawings, a container 10 is adapted to hold liquid under pressure. The container illustrated in this instance is made of glass but obviously other types may be used equally well. The aforesaid contained liquid comprises, generally, a propellant of the conventional low-boiling, non-toxic type, such as the various "Freons" for example, as well as the material to be dispensed by the spray formed on release of the propellant. Composite closure means indicated generally at 12 is disposed in the mouth of the container, sealing the same and affording control of the dispensing of the contents therefrom. As seen more fully in Fig. 1, a valve body or housing 20 of suitable plastic material is provided with a peripheral flange portion 18 which is clamped between a metal closure cap 22 and a sealing gasket 16 which latter sits upon lip 14 at the mouth of the container. Flange 18 and gasket 16 are held in container sealing position by the closure shell 22 which is tightly crimped about the shoulder 11 of the container and holds the parts firmly in place under pressure.

The valve body 20 has a fluid inlet and a fluid outlet at respectively opposite ends and intermediate such ends a stepped, hollow interior, providing chambers diminishing in diameter from top to bottom. The outer or uppermost chamber 24 receives a resilient annular sealing ring or sleeve 26 of elastomeric material which slidably engages, but pressure seals by peripheral constriction against, the wall of a plunger 28 axially reciprocable in the valve body 20. The sealing ring 26 is held in place in chamber 24 by a turned down lip 30 of the closure shell 22, which backs up the sealing ring and prevents its sliding with the plunger 28. A free space 32 is provided in the compartment which holds the sealing ring 26 to accommodate any possible swelling of the ring which may come about as a result of the action thereon of the liquids being dispensed. This arrangement helps to relieve the swelling pressure and discourage binding of the plunger by the sealing ring under circumstances which promote such swelling.

The median chamber 34 in body 20 makes up the larger part of the metering chamber, and by its size determines substantially the amount of fluid which will be dispensed at each valve operation. The plunger 28 extends into the inner chamber 36 which also forms a part of the metering chamber. Its walls are spaced only slightly from the plunger sides and serve as guides for the plunger in its reciprocatory movement. The lower end of the body 20 forms a nipple 38 which has a through passage 40 whose upper end constitutes an inlet port to the metering chamber 34, 36. A conventional elastic dip tube 42 is pressed onto nipple 38 and leads to the bottom of container 10 for transfer of the pressurized fluid in the container from adjacent the container bottom to said body 20.

Figure 2:
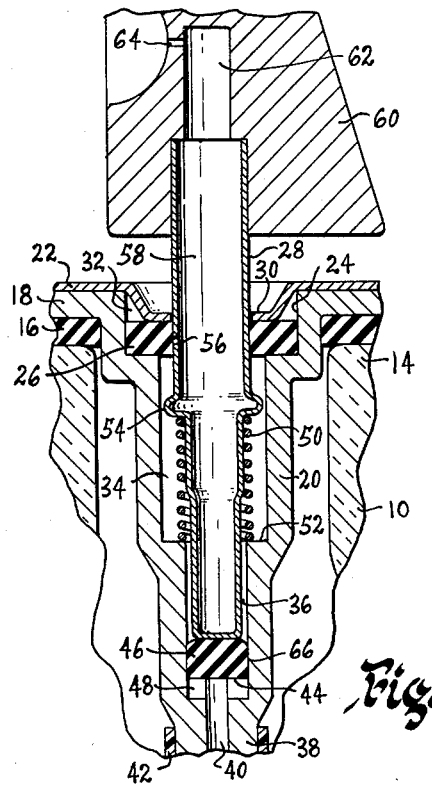
Fig. 2 is a fragmentary section similar to Fig. 1 but showing the plunger in intermediate position.
Figure 3:
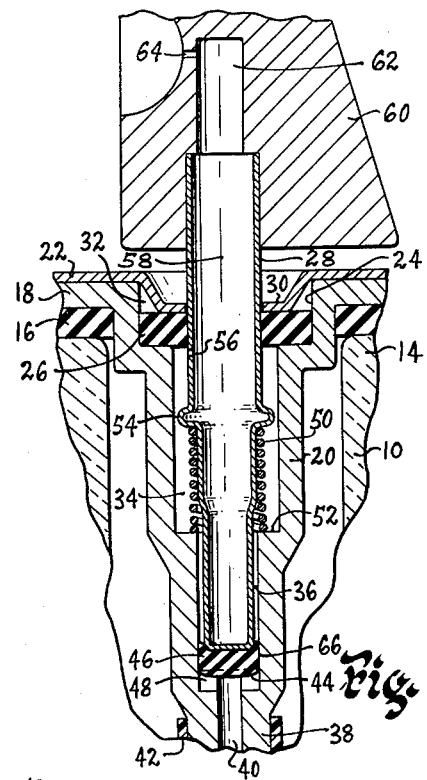
Fig. 3 is a view similar to Fig. 2 but showing the plunger in fully actuated position.
Figure 4:
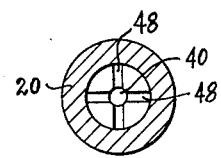
Fig. 4 is a detail section taken on line 4—4 of Fig. 1.

At the bottom of valve chamber 36 is a valve support 44 spaced from and surrounding the passage 40, and normally resting thereon is a valve member 46. The valve member 46 is of compressible sealing material, such as a natural or synthetic elastomer, and provides a free-floating plug or flapper valve. The plug may be of substantially solid, though compressible, material or it may be of sponge-like, expanded consistency formed by small gas filled, enclosed interstices which do not, however, render the plug pervious to the contained liquid. In either case it may be of solid form or it may be hollow and is composed of elastomeric material which is capable of ready compression to a substantial degree, in the process of which such material expands or swells laterally of the direction of application of the compressing force. As shown in Figs. 1 through 6, the member 46 is a cylinder slightly smaller in diameter than the interior dimension of valve chamber 36 and rests with one of its plane end faces against the valve support 44. The plug is also shorter axially than the distance between the inner end of plunger 28 and the end wall, or valve support 44, in chamber 36, thereby permitting the plug some axial as well as lateral play within the chamber in the normal, outer position of the plunger. As shown in Fig. 2, the valve support 44 provides, due to the presence of grooves 48, an irregular surface against which the valve member 46 is unable to seal. The proximity of the walls of the valve chamber 36 to the sides of the valve member 46 is such that the valve member always remains properly oriented as shown and is unable to tumble to another position or become displaced from a location generally in line with the end of passage 40.

The plunger 28 is axially slidable in body 20, as mentioned above, being movable between inner and outer positions. The outer position is shown in Fig. 1, to which it is normally urged by a helical spring 50 which surrounds the plunger and is positioned within chamber 34. One end of the spring 50 bears against a shelf or shoulder 52 which occurs at the lower end of the median chamber 34 where it joins the valve chamber 36. The other end of the spring 50 bears against the underside of an enlargement or collar 54 on the plunger 28 and urges the same upwardly into seated position against the underface of sealing ring 26 which thus acts as a stop member for plunger 28 to limit the upward travel thereof under the influence of spring 50.

The plunger 28 is hollow, and is preferably a formed metal tube closed at the inner or lower end. The interior of the plunger is connected with the median chamber 34 of body 20 by a restrictive port 56 when the plunger is in its innermost position. To achieve this relationship the dimension of the parts including the length of the plunger, the valve chamber 36 and of valve member 46 are so arranged with respect to the placement of restrictive port 56 in the plunger wall that at full compression of the valve member the plunger will be allowed to move inwardly far enough for the port 56 to be exposed inwardly of the sealing ring 26 as in Fig. 3. The sealing ring 26 and port 56, therefore, operate to form the outlet valve of the metering chamber 34, 36. Pressurized fluid in the metering chamber 34, 36 can then escape through port 56 into the interior of the plunger 28, which accordingly serves as an expansion chamber 58 for allowing the substantial gasification of the propellant prior to discharge. The dimensioning of the plunger, valve chamber and compressible valve member or plug is likewise so arranged that the plunger engages and expands the plug to close off the inlet to the chamber 36 before the restrictive port 56 of the plunger is brought into communication with the metering chamber, as will be described more fully hereinafter.

The upper end of the plunger is closed off by a suitable button or actuator head 60 which fits snugly thereon and has a passage 62 connecting with the chamber 58 and leading to a spray orifice 64 from which the puffs of spray are emitted. The head 60 is shaped for engagement on its upper surface by the finger of a user so that the same can be readily operated by being depressed against the force of spring 50.

Assuming the container 10 to be charged with pressurized fluid and preferably with a low-boiling propellant liquid carrying a treating agent, and with the parts in the position shown in Fig. 1, it will be seen that the pressure forces the fluid up through dip tube 42 through passage 40, around valve member 46 and plunger 28 until the metering chamber 34, 36 is filled with fluid at the same pressure as that in the container. The walls of the plunger 28, and especially the enlargement 54 under the influence of said pressure and of the spring 50, are in sealing contact with the sealing ring 26 and retain the fluid pressure therein. When it is desired to dispense a puff of the fluid the head 60 is depressed by the user. What first occurs is shown in Fig. 2 wherein the plunger 28 is shown partially depressed. It can be seen that the end of the plunger now presses against the valve member 46 which has been swelled laterally thereby into sealing contact with the walls of valve chmaber 36, a portion of the latter now constituting a valve seat designated by numeral 66. However, the port 56 is still sealed by the sealing ring 26 so that the contents of metering chamber 34, 36 is at the moment sealed in at both ends. Although the valve member 46 has reached a condition of sealing engagement against the seat 66, its compressibility is such that overtravel of the plunger 28 is allowed, and the head 60 is accordingly further depressed. When the plunger 28 is depressed as far as the valve member 46 will allow, the plunger reaches the position shown in Fig. 3 with the port 56 exposed below the sealing ring 26. In this position of the parts the pressurized contents of the metering chamber 34, 36 is allowed to escape through the port 56 into the expansion chamber 58 and out through passage 62 and orifice 64 as a puff of mist or spray. The head 60 may be held depressed as long as desired and no further discharge will take place, the contents of the metering chamber 34, 36 representing the total supply available for dispensing at this particular actuation. As pressure is relaxed on the head 60 and the return stroke of the plunger 28 under the action of spring 50 begins, port 56 first passes into sealing engagement with the sealing ring 26 while the seal is still maintained by valve member 46 against seat 66, and the parts are again in the position of Fig. 2. Finally, with further relaxation of the finger pressure, the parts return to the Fig. 1 position and pressurized fluid from the container is allowed to pass the now free valve member 46 and refill the metering chamber 34, 36. At each such cycle of operation one small quantity of the contents of the container 10 is dispensed as determined by the size of the metering chamber. The metering chamber is, it will be noted, sealed from the container while dispensing and has its dispensing passage sealed whenever it is being recharged from the container.

It is often preferred to charge the container by a pressure process, so that filling can be carried on where the equipment necessary to a low temperature liquid filling and capping procedure is not available, and the device of the present invention is peculiarly adapted for such purposes. By causing the charging fluid to be held under high pressure and applying it to the exterior of the closure shell 22, the fluid can be caused to pass between the sealing ring 26 and the outer wall of the plunger 28 into the metering chamber 34, 36. This is especially so if the plunger is partly depressed so that the enlargement 54 is withdrawn from sealing contact with ring 26. Since the plunger 28 is not fully depressed the valve member 46 is not swelled into contact with the seat 66, and the fluid pressure, acting in all directions equally on member 46, has no such swelling effect. Accordingly the fluid passes freely around the valve member 46 and into the container via grooves 48, passage 40, and dip tube 42. The pressure required to drive the fluid past the sealing ring is, of course, significantly in excess of the maximum intended to be maintained on the interior of the container, whereby the normal interior pressure will be contained by the sealing ring under normal operating conditions when the plunger is in extended position. Furthermore, by reason of the backing or support offered by lip 30 of the metal closure cap 22, ring 26 acts in the nature of a check-valve, particularly when plunger 12 is slightly depressed so as to remove the annular enlargement 54 from beneath the underside of the ring. Under such conditions, ring 26 is restrained from outward movement by lip 30, occasioned by internal pressure within the dispensing container. However, ring 26 can be deflected inwardly when pressure is applied externally about the plunger 12 to allow filling of the container.

Figure 5:
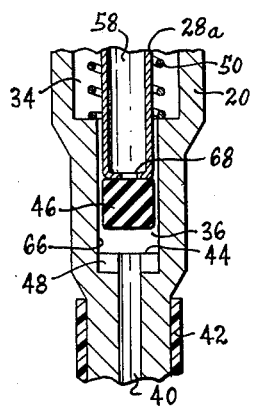
Fig. 5 is a longitudinal section showing parts of an alternative form of the invention.

In Fig. 5 is illustrated an alternative form of the invention wherein the plunger is designated by numeral 28a and the bottom of the plunger is provided with a large opening 68. In all other respects the device is the same as that of Figs. 1 to 4, and operates in substantially the same fashion. The purpose of the opening 68 is to permit more rapid charging of the container when pressure filling methods are used. In this case the head 60 may be left off until after charging is complete and fluid under pressure may be introduced directly through the hollow interior of the plunger 28, through opening 68 and around the valve body 46 as before. Under storage conditions with the plunger 28 in uppermost position between dispensing puffs, the pressure in the metering chamber 34, 36 will equal the container pressure and will normally be sufficient to hold the valve body 46 against the opening 68 to act as a check valve and seal the same, as seen in Fig. 5. When the container or metering chamber pressure drops to a value low enough to permit the valve member 46 to drop away from the end of the plunger and expose the opening 68, the amount of material in the container still to be dispensed will be an insignificant residue. During actual dispensing, the plunger 28 is in lowered position so that the opening 68 is tightly sealed by the compressed valve member 46.

Figure 6:
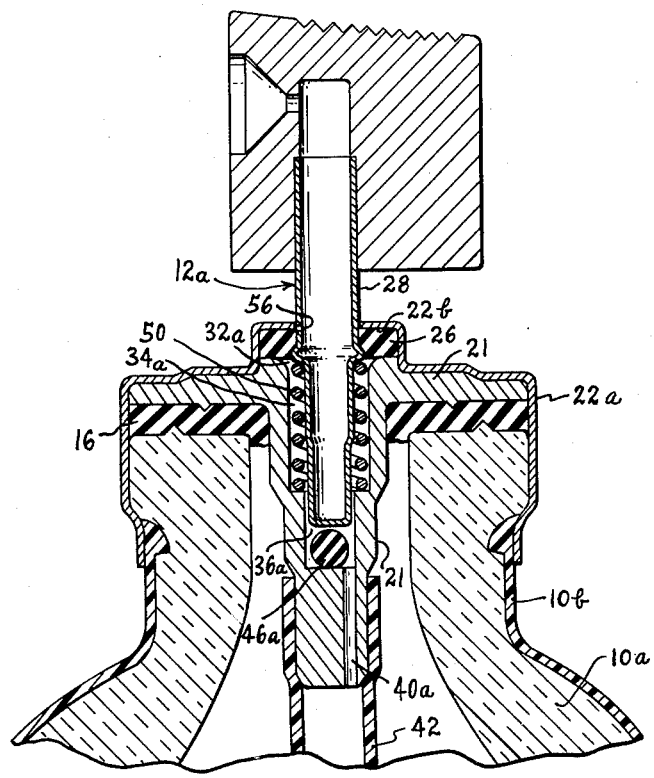
Fig. 6 is a partial view in longitudinal section illustrating a further modification of the valve.
Figure 7:
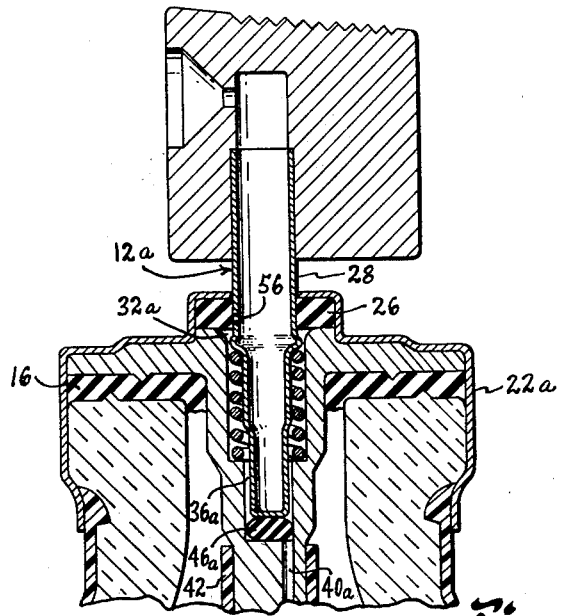
Fig. 7 is a detailed section of parts of the valve shown in Fig. 6 but showing them in a different position of the valve.

The modified construction shown in Figs. 6 and 7 is similar in principle of operation to that of the foregoing illustrations but differs somewhat in its details of construction. A container 10a, similar to that in the preceding examples but having a protective sheath 10b of plastic, has disposed in its mouth in pressure sealing relation a closure and valve assembly 12a. In this instance, the closure shell 22a has a centrally located upwardly directed interior pocket 22b within which annular sealing ring 26 is confined. The interior of valve body 21 is, in this case, flared slightly at its mouth or outlet end so as to provide an expansion space 32a for the same purpose as space 32 of the previous examples. Body 21 also has a measuring chamber 34a and a concentric valve chamber 36a similar in all essential respects to the corresponding portions described hereinbefore.

However, instead of a centrally located axial passage leading through the nipple portion of valve body 21 into communication with the dip tube 42, there is in this instance an eccentrically located passage 40a serving the same purpose as passage 40 in the previously described constructions. And in place of the cylindrical plug or valve member of those constructions, there is a spherical plug 46a, this being slightly smaller in diameter than the diameter of the chamber 36a. In this instance, the valve support for the plug is provided by the central portion of the bottom wall of the metering chamber, and the plug is thus supported for purposes of compressing it to close off the inlet end of the chamber without, however, making it possible for the plug to do so by itself in case pressure filling is employed.

In the upper or extended position of the core or plunger 58, fluid is free to pass around plug 46a from passage 40a, and to fill chambers 34a, 36a, as is apparent. So also may fluid flow take place into the container during pressure filling as previously described, as the plug is incapable of restricting the passage 40a under this condition due to its eccentric location.

When the plunger 28 is depressed, contact is first made between its lower end and plug 46a, causing the latter to be deformed as shown in Fig. 7 to engage the walls of chamber 34a and prevent flow of fluid therethrough. Further depression of the plunger, to a position analogous to that shown in Fig. 3, will then bring the restricted orifice or port 56 of plunger 28 below the seal 26, allowing a measured or metered quantity of fluid, as determined by the size of chambers 34a, 36a, to flow into expansion chamber 58 and out the nozzle orifice 64 in actuator head 60 as before.

The use of a ball type plug as here shown has the special advantage over the cylindrical plug type in that all portions of the surface of the ball are capable of acting at different times as sealing surfaces, and do so fortuitously in actual practice, thus reducing wear on one particular portion of the surface. This use of the ball plug and offset passage 40a also makes it unnecessary to groove or ridge the bottom of chamber 36a, as in the construction shown in Figs. 1 to 4, in order to allow for pressure filling of the container.

Figure 8:
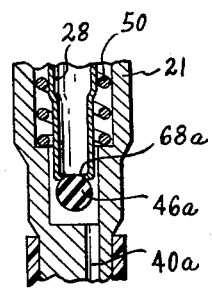
Fig. 8 shows a modified form of the valve.

Moreover the ball type plug has a still further advantage in connection with a plunger of the type shown in Fig. 8 having in its bottom end an aperture 68a. This arrangement is similar to that shown in Fig. 5 and described hereinabove, so that further description here is unnecessary. As is readily apparent, the ball form of plug ordinarily provides a somewhat better seal with the apertured end wall of the plunger than is generally possible in the case of a cylindrical plug.

Various other modifications in construction without departing from the essential concept of the invention are obviously possible and the invention is accordingly not limited to the specific details of construction shown and described hereinabove for purposes of illustration. All such modifications as properly fall within the scope or equivalency of the following claims are therefore intended to be covered.

What is claimed is:

1. A dispensing valve for releasing measured amounts of pressurized fluid from a storage container upon each actuation of the valve, comprising a valve housing having a fluid inlet and a fluid outlet at respectively opposite ends and a metering chamber intermediate said ends, an annular sealing sleeve carried by said housing at its outlet end and a reciprocable plunger passing through said sleeve forming a sliding seal therewith, said plunger extending into said chamber in peripherally spaced relation to the side walls thereof, spring means engaging said plunger and urging it normally outwardly of said chamber, said plunger having a peripheral enlargement intermediate its longitudinal extent engaging with the inner margin of said annular sleeve within said chamber in the outer position of said plunger, a fluid passage in said plunger open to atmosphere at its outer end and a restrictive discharge port in the side of said plunger and communicating with said passage above said enlargement, said discharge port being normally disposed outside said metering chamber but moved thereinto when said plunger is depressed, said valve housing having a valve support at its inlet end and a side wall forming a substantially cylindrical valve seat above said support within said chamber, said valve support being spaced from the inner end of said plunger when the latter is in its normal outer position a distance greater than the axial distance said plunger must be depressed to bring said plunger port into communication with said metering chamber, and a resilient compressible plug member disposed within said chamber between said support and the inner end of said plunger, said plug member being slightly smaller in diameter than the diameter of said cylindrical valve seat but expansible laterally by compression between said plunger and support to seal peripherally against said cylindrical valve seat upon depression of said plunger, said plug having a normal axial length not exceeding the distance from the inner end of said plunger to said support but sufficiently great such that any axial play between the plunger and the plug, in the normal outer position of said plunger, is less than the distance said plunger must be depressed to bring its discharge port into communication with said metering chamber.

2. A dispensing valve as defined in claim 1, wherein said plunger is a hollow tubular stem open at its outer end and closed at its inner end.

3. A dispensing valve as defined in claim 1, wherein said cylindrical valve seat in said metering chamber is of reduced diameter with respect to the rest of said chamber, and the inner end of said plunger is slidingly received in this reduced section with sufficient lateral clearance to permit fluid to pass freely around said plunger end.

4. A dispensing valve as defined in claim 1, wherein said plug member is of substantially cylindrical shape.

5. A dispensing valve as defined in claim 4, wherein said valve support of said metering chamber is formed by a ridge in said valve housing extending from said fluid inlet to a point beyond the periphery of said plug member.

6. A dispensing valve as defined in claim 1, wherein said plug member is of substantially spherical shape.

7. A dispensing valve as defined in claim 6, wherein said inlet in said valve housing is located eccentrically of the longitudinal axis of said plunger.

8. A dispensing valve for releasing measured amounts of pressurized fluid from a storage container upon each actuation of the valve, comprising a generally tubular valve housing having a fluid inlet and a fluid outlet at respectively opposite ends and a metering chamber intermediate said ends, an apertured elastomeric sealing sleeve secured in the outlet end of said housing and a hollow plunger passing through said sleeve forming a sliding seal therewith, said plunger extending into said chamber in peripherally spaced relation to the side walls thereof, said plunger being open at its opposite ends and having a peripheral enlargement intermediate those ends, a spring engaged between said plunger and valve housing and normally urging said plunger outwardly to press said peripheral enlargement into contact with the inner face of said apertured sleeve, said hollow plunger having a restrictive discharge port in its side wall spaced outwardly from said enlargement, which discharge port is disposed outside said metering chamber in the normal outer position of said plunger but which is moved into said chamber upon depression of said plunger against the urging of said spring, said valve housing having at its inlet end a substantially horizontal valve support and a side wall forming a substantially cylindrical valve seat above said support within said metering chamber, said valve support being spaced from the inner end of said plunger when in its normal outer position a distance greater than the axial distance said plunger must be depressed to bring said plunger port into communication with said metering chamber, and a resilient compressible plug member disposed within said chamber between said support and the inner end of said plunger, said plug member being greater in diameter than the opening at the inner end of said plunger but slightly smaller in diameter than the diameter of said cylindrical valve seat, said plug member being expansible laterally by compression between said plunger and valve support into peripheral sealing engagement against said cylindrical valve seat upon depression of said plunger, said plug having a normal axial length not exceeding the distance from the inner end of said plunger to said support but sufficiently great such that any axial play between the plunger and plug, in the normal outer position of said plunger, is less than the distance said plunger must be depressed to bring its discharge port into communication with said metering chamber.

9. A dispensing valve as defined in claim 8, wherein said plug member is of generally cylindrical shape.

10. A dispensing valve as defined in claim 8, wherein said plug member is of generally spherical shape.

11. In a valve means for controlling the discharge of a measured amount of fluid under pressure from a container having a tubular measuring chamber and a valve stem mounted for reciprocation in said chamber to control passage of fluid from the container to the chamber and to dispense the measured charge from the chamber, and means for mounting the valve means on said container, the improvement wherein the container has an open mouth and an annular shoulder on the container adjacent the open mouth and the means for mounting the valve means on the container comprises an annular flange on the chamber engaging a sealing ring disposed on the mouth of the container and extending under a first valve disk and a stepped skirt having a shoulder engaging the flange with the edge of the skirt gripping the annular shoulder on the container.

References Cited in the file of this patent

UNITED STATES PATENTS

| | | |
|---|---|---|
| 2,693,983 | Howell | Nov. 9, 1954 |
| 2,701,163 | Tuller | Feb. 1, 1955 |
| 2,731,298 | Green | Jan. 17, 1956 |
| 2,746,796 | St. Germain | May 22, 1956 |